MAGAZINE TAPE RECORDER/REPRODUCER

Original Filed Oct. 28, 1964

INVENTOR.
JOHANNES J.M. SCHOENMAKERS
BY
Frank R. Trifari
AGENT

United States Patent Office 3,394,899

Patented July 30, 1968

3,394,899

MAGAZINE TAPE RECORDER/REPRODUCER

Johannes Jozeph Martinus Schoenmakers, Emmasingel, Eindhoven, Netherlands, assignor to North American Philips Company, Inc., New York, N.Y., a corporation of Delaware Continuation of application Ser. No. 407,030, Oct. 28, 1964. This application Nov. 15, 1966, Ser. No. 596,388
Claims priority, application Germany, Nov. 30, 1963, N 15,640
3 Claims. (Cl. 242—55.13)

ABSTRACT OF THE DISCLOSURE

This disclosure relates to a magnetic tape recorder/reproducer magazine or cassette in which the magnetic tape is wholly contained on reels and to means for mounting said magazine on a recorder/reproducer such that movement of the magazine during operation is precluded. The tape to be scanned is positioned parallel to one side face of the magazine with said side face containing openings for the insertion of tape scanning means and a pressure idler. The tape scanning means and pressure roller means are movably attached to the recorder/reproducer such that placement of the magazine on the recorder/reproducer and moving said scanning means and pressure roller into operational engagement with the tape contained in the magazine by inserting these elements through openings in the magazine will preclude movement of the magazine in a direction normal to the recorder/reproducer.

This application is a continuation of my co-pending application Ser. No. 407,030 filed Oct. 28, 1964, now abandoned.

The invention relates to a magnetic tape recorder/reproducer in which the tape is wholly contained in a magazine or cassette having a supply reel and a take-up reel. The tape is secured at one end to the core of the supply reel and the other end of the tape is secured to the core of the take-up reel.

With known magazines of this kind, the openings for inserting tape scanning means, a driving shaft and a pressure roller are formed by recesses in the bottom face, the lid face and one of the side faces of the magazine. This permits the magazine to be moved when disposing it on the recorder winding spindle so that the winding spindles are engaged in the reel cores and the pressure roller etc. are inserted into the magazine at the same time. In order to urge the tape against the scanning members, the known apparatus is provided with special pressure means movable in the direction towards the scanning members by a manually operable member. In the known arrangement, the magazine can be readily removed from the apparatus, even if the tape-pressing means are engaged in the "on" position, with the deleterious results that the tape is likely to be damaged or broken.

The invention has for an object to provide a magazine and recorder apparatus in which the magazine is locked against removal in a simple manner after the disposition of the magazine on the apparatus.

According to the invention, the openings for inserting the tape scanning members and the pressure roller are provided solely in one of the vertical side faces of the magazine housing, while at least one opening in the bottom face is provided for inserting the driving shaft or capstan.

In accordance with the invention, the tape scanning members and the pressure roller can be brought into contact with the tape within the magazine by movement of these elements at a right angle to the axes of rotation of the winding spindle and at the same time positively retain the magazine in an operative position. The tape scanning members and pressure member when moved into the corresponding openings in the side wall of the magazine are placed in their operative positions with respect to the tape and simultaneously lock the magazine against undesired movement in the direction of the axes of rotation of the winding spindles. To produce such movement these members are mounted on a support which in turn is mounted on the recorder/reproducer so as to be movable in a direction perpendicular to the axes of rotation of the winding spindles.

The above and other features, objects and advantages of the present invention will be fully understood from the following description considered in connection with the accompanying illustrative drawings.

Figure 1:
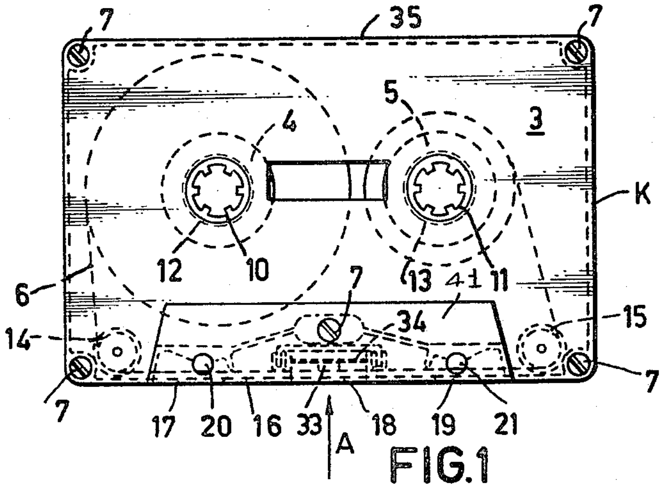
FIG. 1 shows a recording-tape magazine in a plan view, the travel of the tape being indicated diagrammatically.
Figure 2:
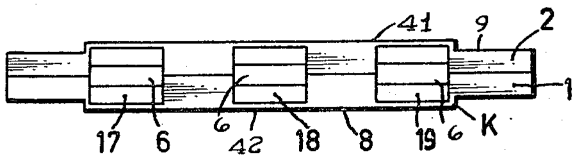
FIG. 2 shows the magazine of FIG. 1 in a side elevation in the direction of the arrow A.

The magazine shown in FIGS. 1 and 2 comprises a housing 3, consisting of two identical parts 1 and 2 and two winding reels or cores 4 and 5 for a magnetic tape 6. Both the bottom face 8 and the lid face 9 of the housing 3 are provided with two openings, those of the lid face 9 being designated in FIG. 1 by 10 and 11. These openings each have a rim-like extension 12 and 13 respectively. The extensions 12 and 13 fit with a certain amount of play in depressions of the winding cores 4 and 5 respectively, which are thus held in place. The winding cores 4 and 5 are centered when the magazine is disposed on the winding spindles fitting into the slotted bores of the winding cores in a known manner.

The magazine includes two guide rollers 14 and 15, over which the tape 6 is guided so that it travels parallel to the front side face 16 of the housing 3. This side face 16 has three openings 17, 18 and 19, behind which the tape 6 extends, as will be seen from FIG. 2. The opening 18 is at the center of the length of the side face 16 and the openings 17 and 19 are located at equal distances from the opening 18.

Figure 4:
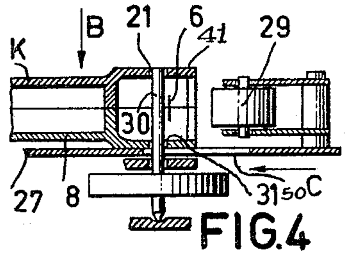
FIG. 4 is a sectional view on an enlarged scale of the apparatus of FIG. 3 taken on the line IV—IV.
Figure 5:
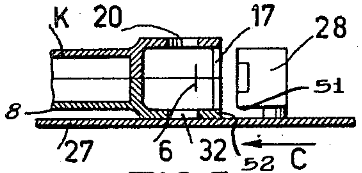
FIG. 5 is a sectional view on an enlarged scale taken on the line V—V in FIG. 3.

The lid or top face 9 is provided with two clearance holes 20 and 21 located near openings 17 and 19 respectively, and the bottom face 8 is provided with similar clearance holes 31 and 32 (see FIGS. 4 and 5). Holes 21, 31 and 20, 32 serve to selectively receive a tape-driving spindle or capstan, later to be described.

Figure 3:
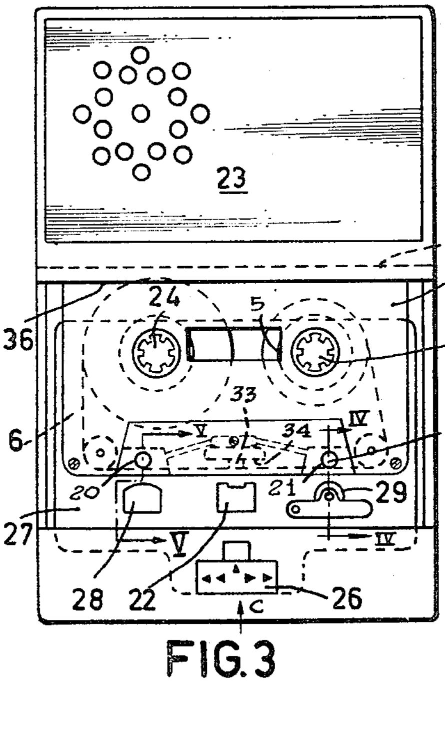
FIG. 3 is a plan view of a recording-tape apparatus with the magazine of FIGS. 1 and 2 positioned thereon, but not latched therein.

As shown in FIG. 3 magazine K is mounted in its operative position on a support of a recorder/reproducer 23 having winding spindles 24 and 25 engaging winding cores 4 and 5 respectively. Carried by a supporting plate 27 are an erasing member 28, a scanning or recording/reproducing head member 22 and a pressure roller member 29. Members 28, 22 and 29 are aligned with openings 17, 18 and 19 respectively; the members are shown more clearly in FIG. 2. Plate 27 is supported in a suitable manner on recorder/reproducer 23 so as to be movable with respect thereto, and to the magazine K, in the direction of the arrow C by a suitable mechanism (not shown) actuated by a knob 26. Thus, when support 27 is moved in the direction of arrow C the erasing head member 22 and the pressure roller head member 29 will be partly passed through openings 17, 18 and 19 respectively into their operative positions adjacent tape 6, while at the same time the magazine will be positively latched, in a manner later to be described, against undesired movement in the axial direction of winding spindles 24 and 25.

As shown more clearly in FIG. 4 the recorder/reproducer 23 is provided with a driving spindle or capstan 30 which may be driven in any suitable manner and which extends through clearance holes 21 and 31 in magazine K. As will be described later the magazine may be placed on the recorder with its lid surface down in which case spindle 30 will pass through clearance holes 20 and 32 as shown in FIG. 5.

FIG. 4 shows the position of the magazine K and of the pressure roller 29 after the magazine has been disposed on the apparatus in the direction of the arrow C so that the spindles are engaged with the reel cores. In this position the magazine is not locked in place and, when moved in a direction opposite the arrow B, it can be removed from the apparatus. However, the magazine cannot be moved in the plane normal to the arrow B.

Figure 6:
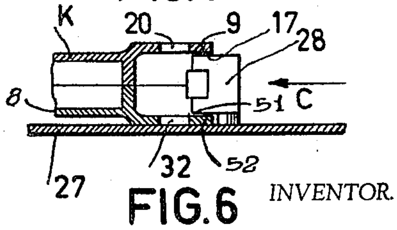
FIG. 6 is a sectional view on an enlarged scale like FIG. 5, the magazine being locked on the recorder.

By means of the control 26 the support 27 can be moved in the direction of the arrow C, so that the pressure roller 29 and at the same time the recording and reproducing head 22 and the erasing head 28 are inserted in the corresponding openings 19, 18 and 17 so that the erasing head occupies the position shown in FIG. 6. In this position, which corresponds with the operational position of the apparatus the lid face 9 and the bottom face 8 extend beyond the heads 28, 22 and the pressure roller 29, so that the magazine K can no longer be removed from the apparatus, i.e. in a direction opposite the arrow B. Not until the support 27 has been moved in a direction opposite the arrow C, by which movement apparatus is switched off, can the magazine be removed. To permit the above-described movement C of the plate 27 relative to the main body of recorder/reproducer 23, and the magazine K mounted thereon, plate 27 is provided with a clearance slot 50 (see FIG. 4) and similar slots (not shown) are of course provided for any other member, such as winding spindles 24 and 25, which might otherwise obstruct such movement. As stated above, and as shown in FIGS. 4, 5 and 6, magazine K is provided with two pairs of clearance holes 21–31 and 20–32 equidistantly spaced from the center of the magazine in outwardly raised, centrally located sections 42 and 41 on said bottom face 8 and lid face 9 respectively. Thus, the magazine can be placed in the position shown in FIGS. 3 to 6 with the bottom face section 42 in contact with sliding support 27 and the rearward portion of the magazine positioned on a ledge (not shown) in groove 36 such that the plane of the tape reels is normal to the axis of driving spindle 30. With said placement the driving spindle will pass through holes 21 and 31, or the magazine can be placed with the raised lid surface 41 in contact with support 27 in which case spindle 30 will pass through clearance holes 20–32. This reversibility permits one to record two tracks on one tape and thus double the recording period.

With reference to FIG. 1 it should be noted that behind the tape 6, in the opening 18, there is provided a felt pressure plate 33 on a spring 34. When the head 22 occupies the operational position, this plate 33 acts as a biasing means and thereby urges the tape 6 against the head 22.

Locking of the magazine on the apparatus by means of the heads 22 and 28 and the pressure roller 29 can be further improved by slipping the magazine, when disposed on the apparatus, with its side face 35, beneath extension 36 (FIG. 3) of the recorder/reproducer apparatus, after which side face 16 of the magazine is tilted downward for inserting the winding spindles 24 and 25 in the winding cores 4, 5 and the driving shaft 30 in the openings 31, 21. This embodiment of the locking arrangement is particularly advantageous when the winding cores 4, 5 have a fairly great amount of play with respect to the housing of the magazine 3 and/or the winding spindles 24, 25 have a great amount of play with respect to the winding cores 4, 5.

To operate the apparatus, plate 27 is placed in the position shown in FIGS. 3 to 6 in which the erasing head member 28, the recording/reproducing head member 22 and the pressure roller member 29 are placed in their inoperative positions as shown. Magazine K is then moved downwardly onto the recorder/reproducer in the direction of arrow B while at the same time inserting the side edge 35 of the magazine in a groove 36 in the recorder housing. During this movement the capstan 30 passes through clearance holes 21–31 and winding spindles 24 and 25 engage winding reels 4 and 5 respectively to thereby drive the reels and prevent undesired movement of the magazine in a direction perpendicular to the axes of spindles 24 and 25. To latch the magazine in its operative position and at the same time place the head members 28, 22 and 29 in their operative positions, adjacent tape 6, plate 27 with members 28, 22 and 29 thereon is moved in the direction of arrow C. During this movement a latching portion of at least one of the members 28, 22 and 29 engage at least one latching portion located at the bottom of one of the openings 17, 18 and 19. As shown in FIG. 6, a latching portion 51 of head 28 engages a latching portion 52 of magazine K. The magazine may be removed from the recorder by reversing the above-described procedure.

While I have shown and described the preferred embodiment of my invention, it will be understood that the latter may be embodied otherwise than as herein specifically illustrated or described and that in the illustrated embodiment certain changes in the details of construction and in the arrangement of parts may be made without departing from the underlying idea or principle of the invention within the scope of the appended claims.

What is claimed is:

1. The combination comprising a magnetic tape recorder/reproducer and magnetic tape magazine; said recorder/reproducer comprising a housing member having deck means including drive means for receiving said magazine, said housing member having a ledge means projecting over said deck means in spaced relation therewith for overlying one edge of said magazine positioned on said deck means and preventing movement of said edge away from said deck means in a plane normal to said deck, a slideable support member connected with said recorder/reproducer for movement relative to said deck means in a plane parallel thereto, magnetic transducer means and pressure roller means mounted on said support member in spaced relation therewith, at least one of said two last-mentioned means including a magazine latching structure, said latching structure being a portion of the surface of the housing of said two last-mentioned means adjacent to the deck, a control member connected with said support for moving said support member linearly in said plane upon like linear movement of said control member; a magazine positioned on said deck means, said magazine having top and bottom walls interconnected by side walls which enclose magnetic tape on a pair of tape reels in lateral spaced relation within said magazine, means in said magazine connected with said tape for guiding said tape across and parallel to one side wall of said magazine, a plurality of openings in said one side wall, said tape being accessible through said openings in said side wall, said top and bottom walls having a raised section adjacent said one side wall, said section extending normally to and beyond the plane of the tape thereby defining at least one magazine-latch engaging portion at the inner periphery of one of said openings, said transducer and pressure means adapted to enter said openings in a plane normal to said tape in one position of said control member to bring at least one of said first mentioned latching structures substantially into contact with at least one of said latch engaging portions to prevent movement of said magazine in a direction normal to said deck means.

2. A small magnetic tape magazine of the cartridge type comprising a housing having top and bottom walls interconnected by side walls, a pair of tape reels including a supply of tape thereon, said tape reels being in lateral spaced relation within said housing, said top and bottom walls each having a pair of openings therethrough concentrically aligned with said tape reels, a core means disposed interiorly of each of said tape reels, each of said cores being concentrically aligned with one of said openings in both of said top and bottom walls, said cores being adapted for closely surrounding and positively engaging a spindle means of a recorder/reproducer, means in said housing connected with said tape for guiding said tape across and parallel to the front side wall of said magazine, the front wall including a plurality of openings therethrough for receiving transducer means and pressure roller means of a recorder/reproducer, said tape being accessible through said openings in said side wall, biasing means attached to said housing for urging said tape against said transducer means, said top and bottom walls each having a section adjacent said front side wall extending normally to and beyond the plane of said tape for providing at least one magazine-latch engaging portion for latchingly engaging at least one of the transducer and pressure roller housing surfaces adjacent a recorder/reproducer deck at the periphery of one of said openings for preventing undesired movement of the magazine in the direction parallel with the axis of the tape reels.

3. A small magnetic tape magazine of the cartridge type comprising a substantially rectangular housing having top and bottom walls interconnected by side walls which enclose magnetic tape on a pair of winding reels, the axes of which are normal to said top and bottom walls and in lateral spaced relation within said housing; a plurality of openings in one side wall of which one is centrally located with respect to said adjacent side walls and at least one opening spaced an equal distance on either side of said central opening, said openings adapted for receiving transducer means and pressure roller means on a recorder/reproducer; means in said housing connected with said tape for guiding said tape across and parallel to said one side wall of said magazine, said tape guiding means comprising two guide rollers, one each located at opposite ends of said one side wall, and a spring biased pressure plate located centrally of said one side wall and in parallel spaced relation to said central opening adapted to force said tape against a transducer means on a recorder/reproducer; said top and bottom walls having a raised section adjacent said one side wall, said section extending normally to said side wall and beyond the plane of the tape paralleling said one side wall, said openings in said one side wall providing edges at the intersection of said one side wall and said raised sections thereby defining at least one magazine-latch portion adapted to engage latch engaging structure on at least one of the transducer and pressure roller housing surfaces adjacent a recorder/reproducer deck for preventing undesired movement of the magazine in the direction parallel with the axis of the winding reels; and two pairs of holes, one pair located in said top and bottom raised sections respectively, each of said top holes positioned in axially aligned spaced relation from said bottom holes and also inwardly of one of said non-central openings in said one side wall, each pair of axially aligned holes for receiving a driving means on a recorder/reproducer; said magazine being symmetrical around an axis passing through the center of said central opening and parallel to said top wall whereby the magazine is operative when either the top or bottom surfaces of said magazine is adjacent a recorder/reproducer thereby providing a double recording/reproducing period.

References Cited

UNITED STATES PATETNS

| | | | |
|---|---|---|---|
| 3,001,025 | 9/1961 | Gaubert | 242—55.13 X |
| 3,027,110 | 3/1962 | Andrews et al. | 242—55.12 |
| 3,107,279 | 10/1963 | Hanes et al. | |
| 3,111,281 | 11/1963 | Sinkewitsch | 242—55.13 |
| 3,126,163 | 3/1964 | Knox | 242—55.13 X |
| 3,145,941 | 8/1964 | Proctor | 242—55.12 |

GEORGE F. MAUTZ, *Primary Examiner.*

UNITED STATES PATENT OFFICE
CERTIFICATE OF CORRECTION

Patent No. 3,394,899 July 30, 1968

Johannes Jozeph Martinus Schoenmakers

It is certified that error appears in the above identified patent and that said Letters Patent are hereby corrected as shown below:

Column 6, line 14, after "magazine-latch" insert -- engaging --; line 15, after "latch" cancel "engaging".

Signed and sealed this 16th day of December 1969.

(SEAL)
Attest:

Edward M. Fletcher, Jr.
Attesting Officer

WILLIAM E. SCHUYLER, JR.
Commissioner of Patents